United States Patent Office 3,053,803
Patented Sept. 11, 1962

3,053,803
POLYNUCLEAR PHENOLS
Gunter S. Jaffe, Oakland, Albert L. Rocklin, Walnut Creek, and John L. Van Winkle, San Lorenzo, Calif., assignors to Shell Oil Company, New York, N.Y., a corporation of Delaware
No Drawing. Filed July 11, 1960, Ser. No. 41,736
18 Claims. (Cl. 260—45.95)

This invention relates to novel polynuclear phenols and to a process for their preparation. More particularly, the invention relates to new phenolic antioxidants, to stabilized compositions containing such phenolic antioxidants, and the preparation of such phenolic compounds from certain benzyl alcohols.

Such alkylated phenols as 2,6-di-tert-butyl-4-methylphenol are well known for stabilizing organic materials including synthetic organic polymers, motor fuels and lubricants against deleterious oxidation. For applications wherein the stabilized composition is exposed to high temperatures, either in preparation or during use, the phenolic antioxidants are somewhat voltatile, and tend to evaporate out of the mixture, leaving the residual composition less resistant to oxidation.

It now has been found that phenolic antioxidants having excellent stabilizing properties combined with low volatility can be prepared by alkylating certain hydroxyaryl compounds with alkylated hydroxybenzyl alcohols. It is therefore an object of this invention to provide novel polynuclear phenolic compounds which may be prepared in this manner. Another object of the invention is the provision of stabilized compositions containing such phenolic antioxidants. Still another object of the invention is a process for preparing such polynuclear phenols. Other objects will be apparent from the following description of the invention.

These objects are accomplished in the invention by the polynuclear phenol comprising up to two mononuclear aryl rings, each ring having up to three hydroxyl groups and from two to three 3,5-dialkyl-4-hydroxybenzyl substituents, at least one of the alkyl radicals on each benzyl nucleous being branched on the alpha carbon atom.

The polynuclear phenols having one substituted phenol ring have the structure

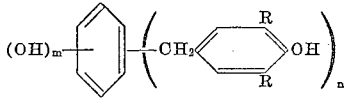

wherein each R is an alkyl radical, preferably having up to 8 carbon atoms, at least one R on each benzyl nucleus being branched on the alpha carbon atom, m is an integer from 1 to 3, and n is an integer from 1 to 3. The substituted aryl nucleus may, however, have as substituents on the ring other hydrocarbyl radicals, preferably lower alkyl radicals such as methyl, ethyl, isopropyl, propyl and butyl. By virtue of their plurality of hindered phenolic groups, these compounds have been found to be superior antioxidants which, because of their otherwise hydrocarbon structure, are readily compatible with such organic materials as rubber, both natural and synthetic, fuels, including gasoline and fuel oil, and lubricants such as motor oils and greases.

As noted, the polyphenols may have from one to two hydroxyl groups on the substituted mononuclear aryl ring. When there are two hydroxy groups, they may be disposed in any configuration, i.e., 1,2; 1,3; and 1,4. For example, in the first case, representative compounds are 1,2 - dihydroxy-4,5-di(3,5-diisopropyl-4-hydroxybenzyl)benzene; 1,2-dihydroxy-3,6-di(3-methyl-5-tert-butyl-4-hydroxybenzyl)benzene; 1,2-dihydroxy-3-methyl-4,5,6-tri-(3,5-di-tert-butyl-4-hydroxybenzyl)benzene; and the like.

Similarly, when the hydroxyl groups on the monoaryl nucleus are in the 1,3-position, exemplary compounds are 1,3 - dihydroxy-4,6-di(3,5-diisopropyl-4-hydroxybenzyl)-benzene; 1,3-dihydroxy-4,6-di(3,5-di-tert-butyl-4-hydroxybenzyl)-5-ethylbenzene; and 1,3-dihydroxy-4,5,6-tri(3-ethyl-5-tert-amyl-4-hydroxybenzyl)benzene. Compounds having the two hydroxyl groups in the 1,4 or para position are represented by 1,4-dihydroxy-2,5-di(3,5-di-tert-amyl-4-hydroxybenzyl)benzene; 1,4 - dihydroxy-2,5-di(3-isopropyl-5-tert-butyl-4-hydroxybenzyl)-6-propylbenzene.

When the aryl nucleus has only one hydroxyl substituent, the compounds of the invention have the structure

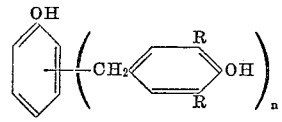

where R and n have the significance noted above. The aryl nucleus may, as in the dihydroxy compounds, also have such hydrocarbyl substituents as phenyl, benzyl and alkyl groups, the lower alkyl groups being preferred. Preferred compounds of this type are the 2,4,6-tri(3,5-dialkyl-4-hydroxybenzyl)phenols, since these have the most antioxidant activity. Typical of these are 2,4,6-tri-(3,5-di-tert-butyl - 4 - hydroxybenzyl)phenol; 2,4,6-tri(3-methyl-5-tert-butyl-4-hylroxybenzyl) phenol; 2,4,6-tri(3,5-diisopropyl-4-hydroxybenzyl)phenol and 2,4,6-tri(3-isopropyl-5-tert-octyl-4-hydroxybenzyl)-3-methylphenol.

Other monohydroxyaryl compounds of this type are those having two 3,5-dialkyl-4-hydroxybenzyl substituents. While these can be in any configuration on the aryl nucleus relative to the hydroxyl group, e.g., 2,5-, 3,5-, the preferred configuration is that wherein one of the dialkyl hydroxybenzyl substituents is ortho to the phenolic hydroxyl group and the other substituent is ortho or para to the phenolic hydroxyl group. Thus, these preferred compounds are the 2,6-di(3,5-dialkyl-4-hydroxybenzyl)-phenols and the 2,4-di(3,5-dialkyl-4-hydroxybenzyl)phenols. Typical of the first group are 2,6-di(3,5-di-tert-butyl-4-hydroxybenzyl)phenol; 2,6-di(3,5-di-tert-butyl-4-hydroxybenzyl)-4-methylphenol; 2,6 - di(3-methyl-5-tert-amyl-4-hydroxybenzyl)phenol; 2,6 - di(3,5-diisopropyl-4-hydroxybenzyl)phenol; and 2,6-di(3,5-di-tert-hexyl-4-hydroxybenzyl)phenol. Typical of the second group are 2,4 - di(3,5-di-tert-butyl-4-hydroxybenzyl)phenol; 2,4-di-.(3,5-diisopropyl-4-hydroxybenzyl)-6-tert-butylphenol; 2,4-di(3,5-di-tert-amyl-4-hydroxybenzyl)phenol; and 2,4-di-(3-isopropyl-5-tert-butyl-4-hydroxybenzyl)phenol.

When only one alkylated hydroxybenzyl radical is attached to the phenol, the compounds are mono-(3,5-dialkyl-4-hydroxybenzyl)phenols. Both p-(3,5-dialkyl-4-hydroxybenzyl)phenols and o-(3,5-dialkyl-4-hydroxybenzyl)phenols are members of this class of compounds. Preferred compounds are those wherein the phenolic nucleus is itself unsubstituted except for the hydroxybenzyl substituent, since in these compounds the phenolic hydroxyl group is most reactive. Exemplary of such compounds are p-(3,5-di-tert-butyl-4-hydroxybenzyl)phenol; p-(3,5-diisopropyl-4-hydroxybenzyl)phenol; o-(3-methyl-5-isopropyl - 4 - hydroxybenzyl)phenol; o-(3-butyl-5-tert-amyl-4-hydroxybenzyl)phenol; and o-(3,5-di-tert-amyl-4-hydroxybenzyl)phenol.

Useful trihydroxy compounds of this type include 1,3,5-trihydroxy - 2,4,6 - tri(3,5 - di - tert - butyl - 4 - hydroxybenzyl)benzene; 1,2,4-trihydroxy-3,5-di(3,5-di-tert-amyl-4-hydroxybenzyl)benzene; and 1,2,3-trihydroxy-4-(3,5-diisopropyl)benzene.

Substituted naphthols of the type described below also have useful antioxidant properties. These compounds comprise a naphthol nucleus substituted with at least one and up to three (3,5-dialkyl-4-hydroxybenzyl) substituents, and are prepared by the alkylation of such compounds as alpha-naphthol and beta-naphthol by the process of the invention. Exemplary of these compounds are 4-(3,5-di-tert-butyl-4-hydroxybenzyl)-alpha-naphthol and 5-(3,5 - diisopropyl - 4 - hydroxybenzyl)-beta-naphthol as well as 5,8-di(3,5-di-tert-amyl-4-hydroxybenzyl)-alpha-naphthol.

Polynuclear polyphenols substituted with 3,5-dialkyl-4-hydroxybenzyl radicals have also been found to have worthwhile stabilizing properties. Such phenols comprise two phenolic, i.e., hydroxybenzene, nuclei which may be directly connected to one another, or which are both attached to the same carbon atom of a lower alkylene radical. It will be seen that both types of compounds can be represented by the general formula

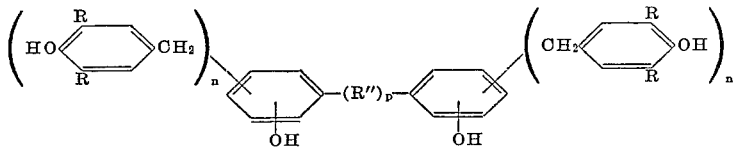

wherein each R is alkyl, preferably having up to 8 carbon atoms, at least one R on each hydroxybenzyl nucleus being branched on the alpha carbon atom; each $n$ is an integer from 1 to 3, but preferably 2; R″ is a lower alkylene radical, and $p$ is from 0 to 1.

In the first instance, the compounds are substituted biphenols having the structure

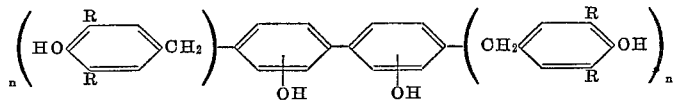

wherein R and $n$ have the above significance. Preferred compounds of this type are those having two hydroxybenzyl radicals on each hydroxyphenyl nucleus, most preferably with each radical being ortho to a hydroxyl group. Such compounds are exemplified by 3,3′,5,5′-tetra(3,5 - di - tert-butyl - 4 - hydroxybenzyl) - 4,4′ - dihydroxybiphenol; 3,3′,5,5′ - tetra(3,5 - di - tert-amyl-4-hydroxybenzyl)-4,4′-dihydroxybiphenol; and 3,3′,5,5′-tetra-(3,5 - diisopropyl - 4 - hydroxybenzyl) - 4,4′ - dihydroxybiphenol. However, the hydroxybenzyl radicals may be in other relationships on the biphenyl nuclei, such as in the compounds 3,3′,5,5′-tetra(3,5-di-tert-butyl-4-hydroxybenzyl)-2,2′-dihydroxybiphenol and 3,3′,5,5′-tetra(3,5-diisopropyl-4-hydroxybenzyl)3,3′-dihydroxybiphenol.

In the second type of polynuclear polyphenol, the compounds have the structure

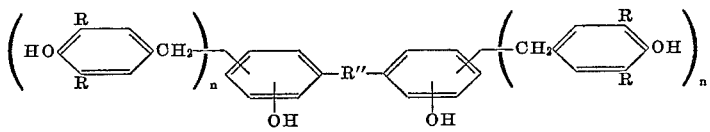

wherein R and $n$ have the above significance and R″ is a lower alkylene radical, preferably one having up to 4 carbon atoms. In such compounds, both of the hydroxyphenyl nuclei attached to the lower alkylene group R″ may be attached to the same carbon atom thereof or to different carbon atoms. In the preferred embodiment of these compounds, there are two hydroxybenzyl radicals, each of which is attached to a ring carbon atom of the hydroxyphenyl nucleus ortho to a hydroxyl group.

Representative of compounds of this type are bis[3,5-di(3,5 - di-tert - butyl - 4 - hydroxybenzyl) - 4 - hydroxyphenyl]methane; 1,2 - bis[3,5 - di(3,5 - diisopropyl-4-hydroxybenzyl)-4-hydroxyphenyl]ethane; 2,2-bis[3,5-di(3,5-di-tert-amyl-4-hydroxybenzyl)-4-hydroxyphenyl]propane; and 1,4-di[3,5-di(3,5-di-tert-butyl-4-hydroxybenzyl)-4-hydroxyphenyl]butane. Also exemplary are such compounds as bis[3,5-di(3,5-diisopropyl-4-hydroxybenzyl)-2- hydroxyphenyl]methane; 1,2-di-[3,5-di(3,5-di-tert-butyl-4-hydroxybenzyl)-2-hydroxyphenyl]ethane; and 2,2-bis[3, 5 - di(3,5 - di - tert - amyl - 4 - hydroxybenzyl) - 2 - hydroxyphenyl]propane.

These compounds are, when pure, white sparkling crystalline solids of relatively high melting point and low volatility. They are conveniently prepared by reacting a mononuclear aryl compound having up to two hydroxyl substituents attached to ring carbon atoms and having at least two replaceable hydrogen atoms attached to ring carbon atoms, with 3,5-dialkyl-4-hydroxybenzyl alcohol, in an inert solvent containing a catalytic amount of a catalyst selected from the group consisting of sulfuric acid and Friedel-Crafts catalysts.

The mononuclear aryl reactants are those monohydroxy, dihydroxy and trihydroxy compounds having a benzene ring which may have other hydrocarbyl substituents but has at least one replaceable hydrogen atom attached to a ring carbon atom. Typical of such dihydroxy compounds are catechol, resorcinol and hydroquinone and their homologs. Representative trihydroxybenzenes are phloroglucinol (1,3,5-trihydroxybenzene) and pyrogallol (1,2,3-trihydroxybenzene), and hydroxyhydroquinone (1, 2,4-trihydroxybenzene). Such compounds may have up to two hydrocarbyl substituents, that is, aryl groups such as phenyl, tolyl, xylyl, mesitylyl, and the like; aralkyl groups such as benzyl, and alkyl groups such as methyl, ethyl, propyl, isopropyl, butyl, isobutyl, etc. Monohydroxybenzene reactants include phenol, the cresols, the ethyl benzenes, the xylenols, o-phenylphenol, and similar compounds. Phenolic ethers such as anisole and phenetole, which behave as phenols, are also suitable reactants.

Binuclear reactants are those phenols having the general structure

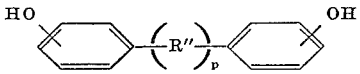

wherein R″ is a lower alkylene radical, and $p$ is from 0 to 1. The two hydroxyphenyl rings may be substituted to the same carbon atom of R″ or they may be on different carbon atoms. Exemplary compounds when $p$ is zero are 4,4′-dihydroxybiphenol and 2,2′-dihydroxybiphenol. Typical of compounds where $p$ is one are bis(4-hydroxyphenyl)methane; 1,2-bis(2-hydroxyphenyl)ethane; 3,3-bis(4-hydroxyphenyl)propane; and 1,4-bis(4-hydroxyphenyl)butane.

Another type of polynuclear phenol which is effective as a reactant is that having the structure

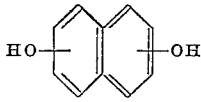

wherein the two nuclei are fused and each is substituted with at least one phenolic hydroxyl group. Exemplary of such compounds are 2,7-dihydroxynaphthalene and 1,5-dihydroxynaphthalene, as well as 1,8-dihydroxynaphthalene. The novel polynuclear polyphenols which may be prepared from these compounds are exemplified by 1,5 - di(3,5 - di - tert - butyl - 4 - hydroxybenzyl) - 4,8-dihydroxynaphthalene; 1,8-di(3,5-diisopropyl-4-hydroxybenzyl)-4,5-dihydroxynaphthalene; and 4,5-di(3,5-di-tert-amyl-4-hydroxybenzyl)-2,7-dihydroxynaphthalene.

These hydroxyaryl compounds are reacted with certain 3,5-dialkyl-4-hydroxybenzyl alcohols in an inert solvent to form the polynuclear polyphenols of the invention. The hydroxybenzyl alcohol reactants are those having the structure

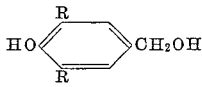

wherein each R is alkyl, preferably having up to 8 carbon atoms, and at least one R is branched on the alpha carbon atom. Suitable alcohols include 3,5-di-tert-butyl-4-hydroxybenzyl alcohol; 3,5-diisopropyl-4-hydroxybenzyl alcohol; 3-methyl-4-hydroxy-5-isopropylbenzyl alcohol; 3-isopropyl-5-tert-butyl-4-hydroxybenzyl alcohol; 3-hexyl-5-tert-octyl-4-hydroxybenzyl alcohol; and the like.

In place of the hydroxybenzyl alcohol, the lower alkyl ethers thereof may be employed. These ethers include 3,5-di-tert-butyl-4-hydroxybenzyl methyl ether; 3,5-diisopropyl-4-hydroxybenzyl ethyl ether; 3,5-di-tert-amyl-4-hydroxybenzyl propyl ether, and other similar ethers wherein the alkoxy radical has up to 4 carbon atoms.

Since the reaction proceeds with any relative concentrations of reactants, it may be conducted with an excess of either the hydroxyaryl compound or of the 3,5-dialkyl-4-hydroxybenzyl alcohol. Preferably, however, substantially stoichiometric amounts of the reactants are employed. Convenient proportions are two to four moles of the dialkyl hydroxybenzyl reactant per mole of the hydroxyaryl compound.

The reaction is conducted in liquid phase in a medium in which both reactants are soluble but with which they are not reactive under the conditions of the process. Suitable liquids include the alkylene halides, such as methylene chloride; ethers, such as dimethyl and diethyl ether; cyclic ethers, such as dioxane and tetrahydrofuran; and other well-known inert solvents such as dimethyl formamide, tert. butyl alcohol, methyl ethyl ketone, and the like. Preferably the solvent should be liquid at or below room temperature and should be non-reactive with both the reactants and the catalyst. The catalyst for the reaction is selected from the group consisting of sulfuric acid and Friedel-Crafts catalysts. Suitable Friedel-Crafts catalysts include boron trifluoride, most conveniently employed as the etherate; ferric chloride, aluminum chloride, titanium tetrachloride, zinc chloride. The sulfuric acid may be used as the concentrated acid, or it may be used in lesser strength, preferably down to about 50% aqueous acid. Whichever type of catalyst is used, it is employed in a catalytic amount sufficient to bring about condensation of the two reactants at a reasonable rate. Suitable concentrations of catalyst are those from 0.001 mole to 1.0 mole of catalyst per mole of the hydroxybenzyl alcohol, and preferably from 0.01 to 0.5 mole per mole of the hydroxybenzyl alcohol. In certain cases, as when the reaction system forms two separate phases, it may be convenient to employ a large excess of the catalyst which may then be recycled from one batch to the next either with or without interim processing to suit the requirements of the process. It has also been observed that amounts of a strong dehydrating agent, preferably phosphorus pentoxide, up to equimolar, based on the Friedel-Crafts catalyst, have been helpful to bring about the reaction at low temperatures.

The reaction is conveniently carried out at temperatures ranging from about 0° C. to about 100° C. and most preferably from about 5° C. to about 50° C., depending on the reactants, solvent and catalyst system employed. While superatmospheric pressures may be employed, atmospheric pressure is in general observed to be sufficient.

When the reaction is completed, the product may readily be separated from reactants, solvent and catalyst by such conventional methods as solvent extraction, fractional distillation, crystallization, or the like. The polynuclear polyphenols are then finished, if necessary, to render them suitable for particular uses by appropriate methods well known in the art such as washing, recrystallization, or clarification.

These polynuclear phenolic products are particularly useful for the preparation of stabilized compositions consisting essentially of an organic material normally subject to oxidative deterioration in which they are incorporated in an amount sufficient to stabilize the composition against oxidation. Because of their superior thermal stabilizing properties and extremely low volatility, they are particularly effective as antioxidants for materials which, during preparation or use, are subjected to elevated temperatures. Examples of such materials are rubber, both natural and synthetic, and such polymerized alpha-olefins as polyethylene, polypropylene, ethylene-propylene copolymers, polystyrene, and lubricants such as oils and greases. These materials are also useful for retarding deterioration of other petroleum materials such as asphalt, and of gums such as agar, gelatin and the like.

Typical rubbers in which the polyphenolic compounds of the invention may be employed include elastomeric rubbery solids such as natural rubber (*Hevea brasiliensis*) and such synthetic rubberlike elastomers as SBR, polyisoprene. All of these deteriorate in the presence of oxygen and ozone by hardening, cracking and checking, and thus losing their resiliency and mechanical strength. When these rubbers are processed, by milling, curing or molding, they are subjected to high temperatures which tend to volatilize some or all of the stabilizer in the rubber. However, the incorporation into the rubber of the polyphenolic compounds of the invention renders the resulting rubber composition resistant to oxidative deterioration during processing, since these novel stabilizers are both heat-stable and relatively non-volatile. As a consequence, the rubber compositions stabilized with these compounds have better retention of color, strength, elasticity and resistance to cracking, checking and tearing than rubber compositions containing less stable antioxidants. The polyphenols may thus be added to the rubber at the latex stage during processing on Banbury mills or included with other substances added to the rubber during the course of manufacture. They are also sufficiently soluble in such hydrocarbons as gasoline, fuel oil, and lubricating oils and greases to that they may be incorporated in stabilizing amounts in such materials. Alternatively, they may be employed as inhibitors in such polymerizable liquid ethylenically unsaturated monomers as vinylbenzenes, including styrene, vinyltoluene and divinylbenzene; acrylates, including methyl acrylate, ethyl acrylate and 2-ethylhexyl acrylate; methacrylates, including methyl methacrylate and ethyl methacrylate; and the like, where traces of oxygen in the monomer may initiate undesirable premature polymerization.

In general, in the stabilized compositions containing the novel polyphenolic compounds described, only an amount of any particular compound sufficient to stabilize the material against oxidative deterioration will be required. The requisite amount will, of course, depend both on the efficacy of the particular polyphenolic compound and on the nature of the normally oxidizable substrate in which it is employed. It has been found that amounts of the stabilizers from about 0.0001% by weight to about 10% by weight, based on the organic substrate, are sufficient. For example, suitable concentrations of the polyphenolic compounds in distillate fuels, e.g., kerosene, furnace oil, are on the order of 0.0007% w. to about 0.0028% w., while in rubber somewhat larger amounts, up to about 10% w., are required.

It will be understood that, in addition to containing a stabilizing amount of the polyphenolic compounds described, the organic compositions of the invention may contain such other ingredients as other antioxidants, coloring agents, and the like. For example, in rubber or plastic compositions such additives as pigments, fillers, antiozonants and curing agents will be employed, while in fuel compositions such additives as anti-icing agents, dyes, antiknock and antimiss agents and similar conventional ingredients will be found. Lubricants will contain gelling agents, extreme pressure additives, and such other materials as are employed in commercial preparations. These additives will not interfere with the superior stabilizing effect of the polyphenols of the invention.

EXAMPLE I

A mixture of 47.23 g. (0.2 mole) of 3,5-di-tert-butyl-4-hydroxybenzyl alcohol and 6.28 g. (0.07 mole) of phenol was stirred with 200 ml. of methylene chloride at 0° C. To the resulting mixture was added 40 g. of 80% sulfuric acid over an 18-minute period. After addition of the acid was complete, the mixture was allowed to warm to room temperature, 25° C., and was stirred for about two hours.

At the end of this time the mixture was washed four times with water to remove the acid and the methylene chloride solvent was evaporated off. The residue was 61.8 g. of a viscous liquid which crystallized on stirring. The crystals were broken up to yield a dry white powder, washed thoroughly with isopentane, and recrystallized from isooctane to yield 34.8 g. of granular white solid. Analysis of this material showed it to be 2,4,6-tri(3,5-di-tert-butyl-4-hydroxy-benzyl)phenol having a melting point of 162.0–162.5° C. The compound had the following composition:

|  | C | H | M.W. |
|---|---|---|---|
| Calculated | 81.7 | 9.7 | 749 |
| Found | 81.9 | 9.7 | 748 |

EXAMPLE II

A mixture of 118.0 g. (0.5 mole) of 3,5-di-tert-butyl-4-hydroxybenzyl alcohol, 23.5 g. (0.25 mole) of phenol, and 500 ml. of methylene chloride was stirred in an ice bath while 100 g. (59 ml.) of 80% sulfuric acid was added over a 45-minute period. The mixture was allowed to warm to room temperature, about 25° C., with stirring, for 2½ hours. The solution was washed four times to remove the acid, dried, decolorized with activated charcoal, and the solvent evaporated off. The product was a dry light-colored powder whose infrared spectrum showed it to be di(3,5-di-tert-butyl-4-hydroxybenzyl)phenol.

EXAMPLE III

A solution of 25.0 g. (0.1 mole) of 3,5-di-tert-butyl-4-hydroxybenzyl methyl ether, 3.20 g. (0.033 mole) of phenol and 100 ml. methylene chloride was cooled in an ice bath to about 3° C. with stirring, and to it was added 20 g. of 80% sulfuric acid. After addition of the acid was complete, the mixture was allowed to warm to room temperature, about 25° C., and stirring was continued for 2½ hours.

The acid was then washed from the mixture and the solvent evaporated. The dry residue was washed with pentane and isopentane and dried. Analysis of the product showed it to have the same infrared spectrum and molecular weight as the product of Example I, 2,4,6-tri-(3,5-di-tert-butyl-4-hydroxybenzyl)phenol.

EXAMPLE IV

Employing equimolar amounts of phenol and 3,5-di-tert-butyl-4-hydroxybenzyl alcohol in methylene chloride, and the methods of the previous examples, p-(3,5-di-tert-butyl-4-hydroxybenzyl)phenol was prepared in the same manner.

The compound was a white sparkling crystalline solid having a melting point of 138.5–139.5° C. and the following analysis:

|  | C | H | M.W. |
|---|---|---|---|
| Calculated | 80.75 | 8.98 | 312 |
| Found | 80.9 | 9.0 | 315 |

Employing the techniques of the previous examples, 3,5-di-tert-butyl-4-hydroxybenzyl alcohol was reacted with 3,5-xylenol in a 4:1 molar ratio. The product, 2,4,6-tri(3,5 - di - tert - butyl-4-hydroxy-benzyl)-3,5-dimethylphenol, was obtained in 50% yield. The compound was a crystalline solid having a melting point of 197.1–198.2° C. and the following composition:

|  | C | H |
|---|---|---|
| Calculated | 82.0 | 9.8 |
| Found | 82.0 | 9.9 |

EXAMPLE VI

Employing the methods described above, 3,5-di-tert-butyl-4-hydroxybenzyl alcohol and phloroglucinol were reacted together in a 4:1 molar ratio. The product, 1,3,5-trihydroxy - 2,4,6 - tri(3,5 - di - tert - butyl - 4 - hydroxybenzyl)benzene, was obtained in substantial yield.

EXAMPLE VII

Employing the above methods, an excess of 3,5-di-tert-butyl-4-hydroxybenzyl alcohol was reacted with 2,2-(4-hydroxyphenyl)propane. The product, a white crystalline solid, was 2,2-di[3,5-di-(3,5-di-tert-butyl-4-hydroxybenzyl)-4-hydroxyphenyl]propane.

The compound 3,3',5,5'-tetra(3,5-di-tert-amyl-4-hydroxybenzyl)-4,4'-dihydroxybiphenol is prepared in a similar manner from 3,5-di-tert-amyl-4-hydroxybenzyl alcohol and 4,4'-dihydroxybiphenol.

EXAMPLE VIII

Samples of the polyphenolic compounds prepared above were evaluated as stabilizers in polypropylene. Polypropylene film samples, each containing 0.25% w. of one of the compounds screened, were tested by heat aging, outdoor exposure and Weatherometer. The resulting data are presented in Table I.

In the heat-aging test, polypropylene samples five mils thick were maintained in an oven at 133° C. Each sample was tested three times a day for loss of elongation until the film tore readily. The number of days shown on the table are the total elapsed days before the film tested lost its tensile strength and flexibility. It will be seen from these data that the polyphenolic compounds tested increased the heat stability of the polypropylene by a factor of at least 5.

In the outdoor exposure test, 5 mil samples of polypropylene were exposed on the roof of the Emeryville laboratory building and periodically tested by bending through 180°. The number of weeks required before each film tested broke on bending is shown in the table. It will be seen that the polyphenolic compounds increased the weather stability of the polypropylene films by a factor of at least about 2.

In the accelerated FadeOmeter test, the conventional Atlas Weatherometer arc light source was supplemented with eight fluorescent ultraviolet light sources. All film samples tested passed within a quarter inch of the light sources. It has been found that in this accelerated test, conditions are approximately eight times as stringent as in the unmodified Weatherometer. It will be seen from the table that the polyphenolic compounds generally increased the ultraviolet light stability of the polypropylene under these extreme conditions.

Table I

| Compound Tested | Heat Aging, Days | Outdoor Exposure, Weeks | Accel. Fade-Ometer, Days |
|---|---|---|---|
| None | <0.5 | ~0.5 | 2.5 |
| p-(3,5,-Di-tert-butyl-4-hydroxybenzyl)phenol | 3.5 | 5 | 5 |
| 2,4-Di(3,5-di-tert-butyl-4-hydroxybenzyl)phenol | 15 | 1.5 | 3 |
| 2,4,6-Tri(3,5-di-tert-butyl-4-hydroxybenzyl)phenol | 25.5 | 3.5 | 1.5 |
| 2,6-Di(3,5-di-tert-butyl-4-hydroxybenzyl)-4-tert-butylphenol | 12 | 1 | 3.5 |

EXAMPLE IX

The oxidation rates of samples of white mineral oil containing various phenolic additives were evaluated at 150° C. by the Dornte method; see I and EC 34, 927 (August 1942).

The results of these measurements are tabulated in Table II.

Table II

| Additive | Conc., percent w. | Induction period, Hrs. |
|---|---|---|
| None | 0 | 1 |
| 2,4,6-Tri(3,5-di-tert-butyl-4-hydroxybenzyl)phenol | 0.28 | 33.5 |
| 3,3',5,5'-Tetra-tert-butyl-4,4'-dihydroxy-biphenyl | 0.1 | 19 |
| 3,5-Di-tert-butyl-4-methylphenol | 0.1 | 12.5 |
|  | 0.2 | 16 |
|  | 0.4 | 21.5 |
| Bis(3,5-di-tert-butyl-4-hydroxyphenol)methane | 0.1 | 27 |
|  | 0.2 | 38 |
| 2,2-Bis[3,5-di(3,5-di-tert-butyl-4-hydroxybenzyl)-4-hydroxyphenyl]propane | 0.31 | 32 |
| 2,2-Bis(4-hydroxyphenyl)propane | 0.13 | 3.5 |
| 2,4,6-Tri(3,5-di-tert-butyl-4-hydroxybenzyl)3,5-dimethylphenol | 0.29 | 22.5 |

EXAMPLE X

To evaluate the effectiveness of several antioxidants in a typical fatty oil, induction period measurements were made using the gravimetric method of Olcott and Einsett, J. Am. Oil Chem. Soc. 35, 161 (1958). Samples of safflower oil containing 0.02% w. of the antioxidants were stored in an oven at 50° C. and weighed daily until a rapid increase in weight was observed. The data showing the relative efficiencies of the antioxidants tested are presented in the following table. Data presented are days to rancidity.

Table III

| Antioxidant | Days to Rancidity, 50° C. |
|---|---|
| None | 5¾ |
| Bis(3,5-di-tert-butyl-4-hydroxyphenyl)methane | 7¼ |
| 2,6-Di-tert-butyl-4-(4-hydroxybenzyl)phenol | 9½ |
| 2,4,6-Tri(3,5-di-tert-butyl-4-hydroxybenzyl)phenol | 9¾ |
| 2,2-Bis[3,5-di-3,5-di-tert-butyl-4-hydroxybenzyl)-4-hydroxyphenyl]propane | 12¼ |

We claim as our invention:

1. 2,4,6-tri(3,5-dialkyl-4-hydroxybenzyl)phenol wherein each of the alkyl radicals has up to 8 carbon atoms and at least one of the alkyl groups on each benzyl nucleus is branched on the alpha carbon atom.

2. 3,5-dialkyl-4-hydroxybenzyl-dihydroxy-naphthalene wherein at least one of the alkyl groups has up to 8 carbon atoms and is branched on the alpha carbon atom.

3. Di(3,5-dialkyl-4-hydroxybenzyl)phenol wherein each of the alkyl radicals has up to 8 carbon atoms and each of said alkyl groups on each benzyl nucleus is branched on the alpha carbon atom and wherein each 3,5-dialkyl-4-hydroxybenzyl group is attached to one of the ring carbon atoms ortho and para to the phenolic hydroxyl.

4. 2,6-di(3,5-di-tert-butyl-4-hydroxybenzyl)phenol.

5. 2,4,6-tri(3,5-di-tert-butyl-4-hydroxybenzyl)phenol.

6. p-(3,5-di-tert-butyl-4-hydroxybenzyl)phenol.

7. The polynuclear polyphenol having the structure

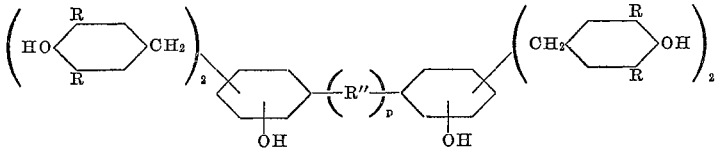

wherein each R is an alkyl radical having up to 8 carbon atoms and R" is an alkylene radical having up to 4 carbon atoms, and p is an integer from 0 to 1.

8. 3,3',5,5'-tetra(3,5-di-tert-butyl-4-hydroxybenzyl)-4-dihydroxybiphenol.

9. The stabilized composition consisting essentially of a polymerized alpha olefin containing an amount of a mononuclear monohydroxy polynuclear phenol having from one to three 3,5-dialkyl-4-hydroxybenzyl substituents, each of said of the alkyl radicals on each benzyl nucleus being branched on the alpha carbon atom, said polynuclear phenol having at least three six-membered nuclei in the molecule and having a phenolic hydroxyl group on each nucleus, in amount sufficient to stabilize the composition against oxidative deterioration.

10. The stabilized composition consisting essentially of polypropylene containing an amount of 2,4,6-tri(3,5-di-tert-butyl-4-hydroxybenzyl)phenol sufficient to stabilize the composition against oxidative deterioration.

11. The stabilized composition consisting essentially of a rubber selected from the group consisting of natural and synthetic rubber containing an amount of 2,4,6-tri-(3,5-di-tert-butyl-4-hydroxybenzyl)phenol sufficient to stabilize the composition against oxidative deterioration.

12. The process for preparing the polynuclear phenol of claim 1 which comprises reacting a phenol having from one to two phenyl rings, having from one to three hydroxyl groups attached to each phenyl ring, and having at least one replaceable hydrogen atom on a ring carbon atom, with 3,5-dialkyl-4-hydroxybenzyl alcohol, each of the alkyl radicals having up to 8 carbon atoms, in an inert solvent containing a catalytic amount of a catalyst selected from sulfuric acid and Friedel-Crafts catalysts.

13. The process for preparing the polynuclear phenol of claim 1 which comprises reacting a phenol having from one to two hydroxyphenyl rings, and at least one replaceable hydrogen atom on a ring carbon atom, with 3,5-di-tert-butyl-4-hydroxybenzyl alcohol, in an inert solvent containing a catalytic amount of a mixture of boron trifluoride and phosphorus pentoxide.

14. The process for preparing the polynuclear phenol of claim 1 which comprises reacting a phenol having from one to two hydroxyphenyl rings and having at least one replaceable hydrogen atom on a ring carbon atom, with 3,5-di-tert-butyl-4-hydroxybenzyl alcohol, in an inert solvent containing a catalytic amount of sulfuric acid.

15. The stabilized composition consisting essentially of a hydrocarbon material normally subject to oxidative deterioration and containing the polynuclear phenol comprising from one to two mononuclear aryl rings, each ring having from one to three hydroxyl groups and from one to three 3,5-dialkyl-4-hydroxybenzyl substituents wherein each of the alkyl radicals has up to 8 carbon atoms and each of said alkyl radicals on each benzyl nucleus is branched on the alpha carbon atom, said polynuclear phenol having at least three six-membered nuclei in the molecule and having a phenolic hydroxyl group on each nucleus, and each of said 3,5-dialkyl-4-hydroxybenzyl groups being attached to one of the ring carbon atoms ortho and para to the hydroxyl group, in amount sufficient to stabilize the composition against oxidative deterioration.

16. 2,4,6 - tri(3,5 - di - tert - butyl - 4 - hydroxybenzyl)-3,5-dimethyl phenol.

17. The polynuclear phenol comprising from one to two mononuclear aryl rings, each ring having from one to three hydroxyl groups, and from one to three 3,5-dialkyl-4-hydroxylbenzyl groups, wherein each alkyl group has up to 8 carbon atoms and is branched on the alpha carbon atom, said polynuclear phenol having at least three six-membered nuclei in the molecule and having a phenolic group on each nucleus, and each 3,5-dialkyl-4-hydroxybenzyl group being attached to a ring carbon atom on said aryl nucleus which is one of the ring carbon atoms ortho and para to the hydroxyl group.

18. 2,2 - bis[3,5 - di(3,5 - di - tert - butyl - 4 - hydroxybenzyl)-4-hydroxyphenyl]propane.

References Cited in the file of this patent

UNITED STATES PATENTS

| 1,970,972 | Orthner et al. | Aug. 21, 1934 |
| 2,248,831 | Stillson et al. | July 8, 1941 |
| 2,820,775 | Chamberlain et al. | Jan. 21, 1958 |
| 2,905,737 | Webb | Sept. 22, 1959 |
| 2,944,086 | Coffield et al. | July 5, 1960 |

FOREIGN PATENTS

| 208,596 | Australia | Oct. 27, 1955 |
| 806,014 | Great Britain | Dec. 17, 1958 |

Notice of Adverse Decision in Interference

In Interference No. 94,294 involving Patent No. 3,053,803, G. S. Jaffe, A. L. Rocklin and J. L. Van Winkle, POLYNUCLEAR PHENOLS, final judgment adverse to the patentees was rendered Apr. 7, 1966, as to claims 3, 9, 15 and 17.

[*Official Gazette June 28, 1966.*]